United States Patent
Eschenburg et al.

(10) Patent No.: US 10,179,477 B2
(45) Date of Patent: Jan. 15, 2019

(54) AXLE ASSEMBLY HAVING A SUPPORT BEARING ASSEMBLY

(71) Applicant: ArvinMeritor Technology, LLC, Troy, MI (US)

(72) Inventors: Dale Eschenburg, Rochester Hills, MI (US); Steven Chinitz, Plymouth, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 296 days.

(21) Appl. No.: 15/205,255

(22) Filed: Jul. 8, 2016

(65) Prior Publication Data
US 2018/0009260 A1    Jan. 11, 2018

(51) Int. Cl.
| | |
|---|---|
| *B60B 35/12* | (2006.01) |
| *B60B 35/16* | (2006.01) |
| *B60B 35/18* | (2006.01) |
| *F16H 48/08* | (2006.01) |
| *F16H 48/40* | (2012.01) |
| *F16H 57/037* | (2012.01) |

(52) U.S. Cl.
CPC ............ *B60B 35/125* (2013.01); *B60B 35/16* (2013.01); *B60B 35/18* (2013.01); *F16H 57/037* (2013.01); *F16H 48/08* (2013.01); *F16H 2048/405* (2013.01)

(58) Field of Classification Search
None
See application file for complete search history.

(56) References Cited

U.S. PATENT DOCUMENTS

| | | | | |
|---|---|---|---|---|
| 2,129,580 | A | | 9/1938 | Heslep |
| 2,133,112 | A | | 10/1938 | Ormsby |
| 4,277,985 | A | | 7/1981 | Kostello et al. |
| 5,098,355 | A | * | 3/1992 | Long ............... B60K 17/16 475/220 |
| 5,183,445 | A | * | 2/1993 | Alt .................. B60K 17/16 188/82.84 |
| 6,695,739 | B2 | * | 2/2004 | Fett ................. F16H 48/08 475/230 |
| 9,028,358 | B2 | * | 5/2015 | Valente ........... F16H 48/08 475/248 |
| 9,157,515 | B2 | * | 10/2015 | Downs ............. F16H 48/08 |
| 2014/0339888 | A1 | | 11/2014 | Downs et al. |

FOREIGN PATENT DOCUMENTS

FR          405616 A     1/1910

OTHER PUBLICATIONS

United States Patent and Trademark Office, U.S. Appl. No. 14/853,309, filed Sep. 14, 2015.
European Patent Office, Extended European Search Report for the corresponding European Patent Application No. 17179752.5 dated Nov. 6, 2017.

* cited by examiner

Primary Examiner — Jacob S. Scott
(74) Attorney, Agent, or Firm — Brooks Kushman P.C.

(57) ABSTRACT

An axle assembly having a support bearing assembly. The support bearing assembly may be mounted to a differential carrier and may engage a back side of a ring gear. The support bearing assembly may rotatably support the ring gear and may inhibit deflection of the ring gear away from a drive pinion.

20 Claims, 7 Drawing Sheets

AXLE ASSEMBLY HAVING A SUPPORT BEARING ASSEMBLY

TECHNICAL FIELD

This disclosure relates to an axle assembly that has a support bearing assembly that may limit or inhibit deflection of a ring gear.

BACKGROUND

An axle assembly having a ring gear is disclosed in U.S. Pat. No. 9,677,661.

SUMMARY

In at least one embodiment, an axle assembly is provided. The axle assembly may include a differential carrier, a ring gear, a drive pinion, and a support bearing assembly. The ring gear may be rotatably engaged by the differential carrier. The ring gear may have a set of teeth and a back side disposed opposite the set of teeth. The drive pinion may be in meshing engagement with the set of teeth of the ring gear. The support bearing assembly may be mounted to the differential carrier and may engage the back side of the ring gear. The support bearing assembly may rotatably support the ring gear and inhibit deflection of the ring gear away from the drive pinion.

In at least one embodiment, an axle assembly is provided. The axle assembly may include a differential carrier, a ring gear, a drive pinion, and a set of support bearing assemblies. The ring gear may be rotatably disposed in the differential carrier. The ring gear may have a set of teeth and a back side that may be disposed opposite the set of teeth. The drive pinion may mesh with the set of teeth. The set of support bearing assemblies may extend from the differential carrier toward the back side of the ring gear. At least one member of the set of support bearing assemblies may be disposed closer to the back side than another member of the set of support bearing assemblies.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
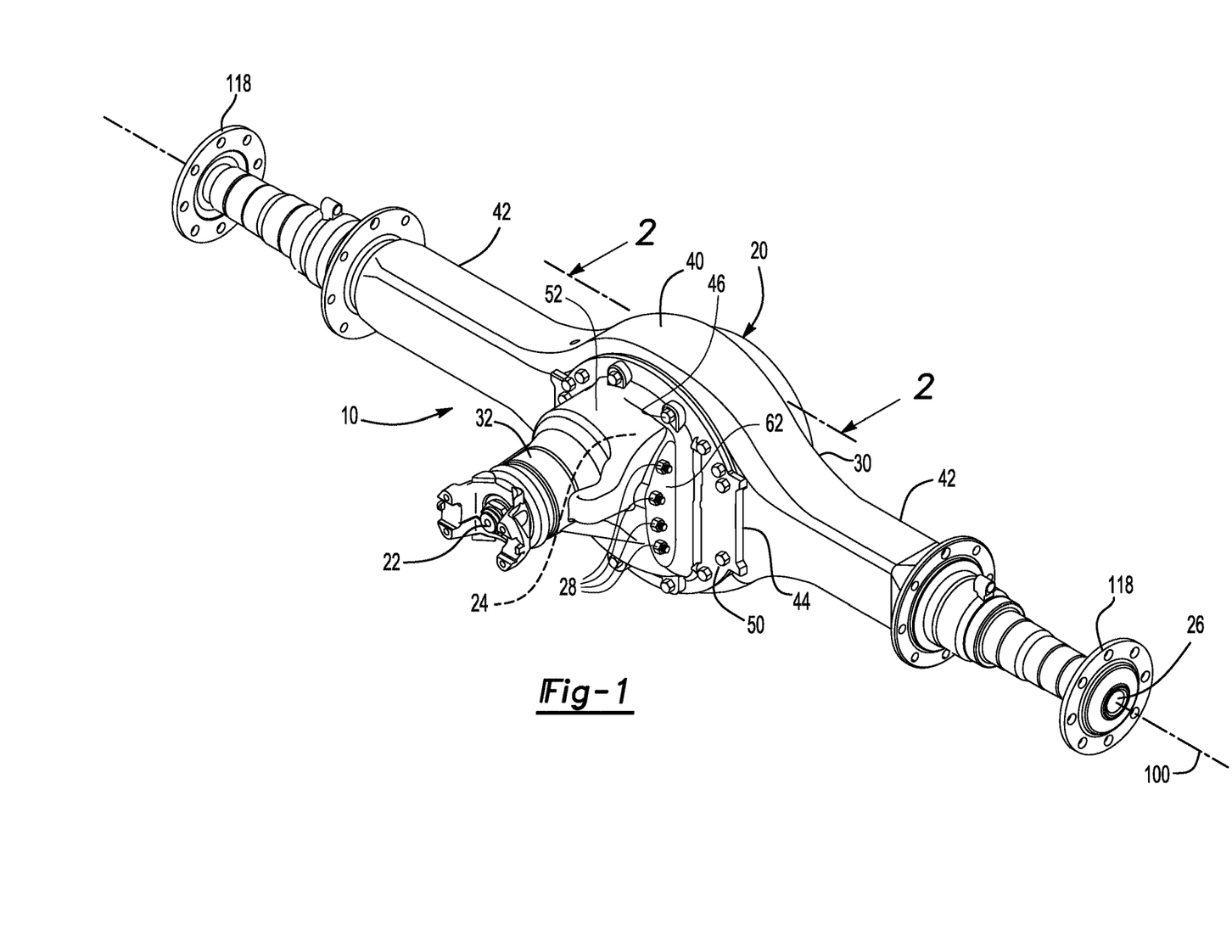
FIG. 1 is a perspective view of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, a drive pinion 22, a differential 24, at least one axle 26, and at least one support bearing assembly 28.

Figure 2:
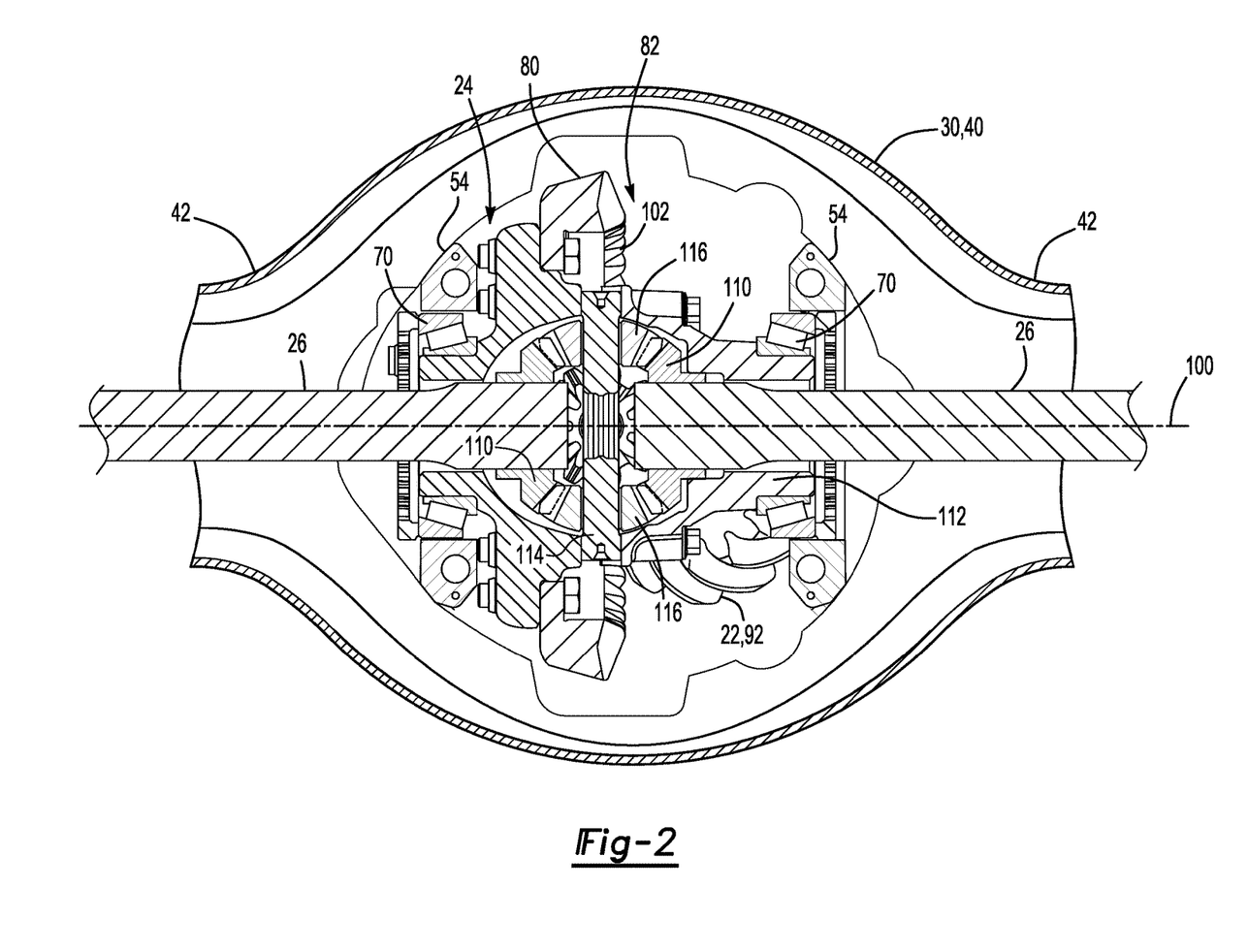
FIG. 2 is a section view of the axle assembly along section line 2-2.

The housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axles 26. In at least one embodiment, the axle housing 30 may include a center portion 40, at least one arm portion 42, and a mounting surface 44.

The center portion 40 may be disposed proximate the center of the axle housing 30. The center portion 40 may at least partially define a cavity that may receive the differential 24.

One or more arm portions 42 may extend from the center portion 40. For example, two arm portions 42 may extend in opposite directions from the center portion 40 and away from the differential 24. The arm portions 42 may have substantially similar configurations. For example, the arm portions 42 may each have a hollow configuration or tubular configuration that may extend around the corresponding axle 26 and may help separate or isolate the axle 26 from the surrounding environment. An arm portion 42 or a portion thereof may be integrally formed with the center portion 40 in one or more embodiments.

The mounting surface 44 may face toward and may engage the differential carrier 32. The mounting surface 44 may facilitate mounting of the differential carrier 32 to the axle housing 30. For example, the mounting surface 44 may have a set of holes that may be aligned with corresponding holes on the differential carrier 32. Each hole may receive a fastener 46, such as a bolt, that may couple the differential carrier 32 to the axle housing 30.

Figure 3:
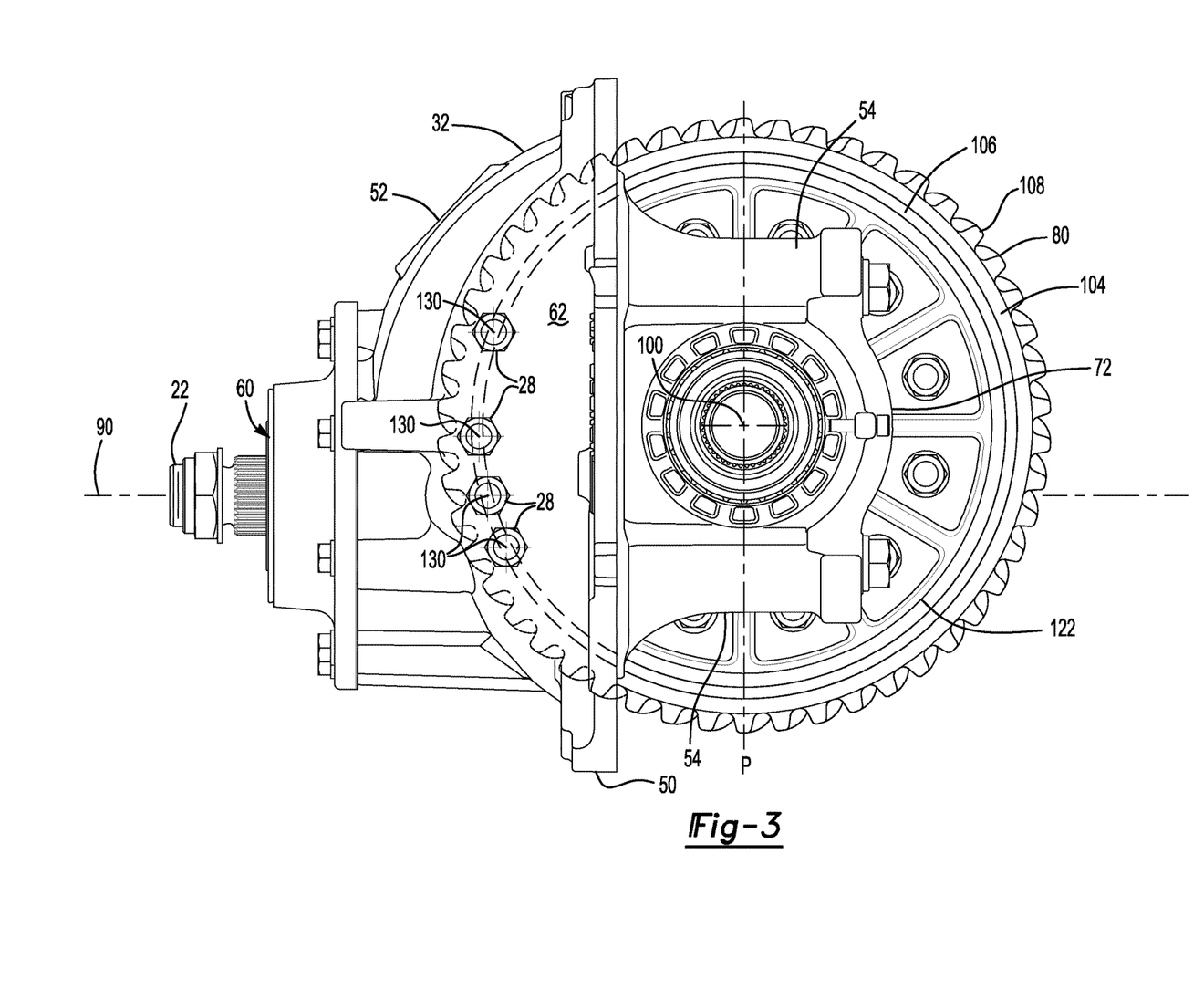
FIG. 3 is a side view of a differential carrier having a drive pinion and a ring gear.

Referring to FIGS. 1 and 3, the differential carrier 32, which may also be called a carrier housing, may be mounted to the center portion 40 of the axle housing 30. The differential carrier 32 may support the differential 24 and its associated components. In at least one embodiment, the differential carrier 32 may have a flange portion 50, a cover portion 52, and a bearing support 54.

The flange portion 50 may facilitate mounting of the differential carrier 32 to the axle housing 30. For example, the flange portion 50 may be disposed proximate and may engage the mounting surface 44 of the axle housing 30 and may have a set of holes that may receive fasteners 46 as previously discussed. The flange portion 50 may be substantially planar in one or more embodiments.

The cover portion 52 may extend from the flange portion 50. For example, the cover portion 52 may be encircled by the flange portion 50 and may extend away from the center portion 40 of the axle housing 30. In at least one embodiment, the cover portion 52 may have an input opening 60 and a support bearing mounting surface 62.

The input opening 60 may receive the drive pinion 22 or an input shaft that may be configured to provide torque to the differential 24. The input opening 60 may be configured as a through hole that may be disposed off-center on the cover portion 52. For instance, the input opening 60 may be generally disposed on an opposite side of a vertical center line of the differential carrier 32 from the support bearing mounting surface 62.

Figure 6:
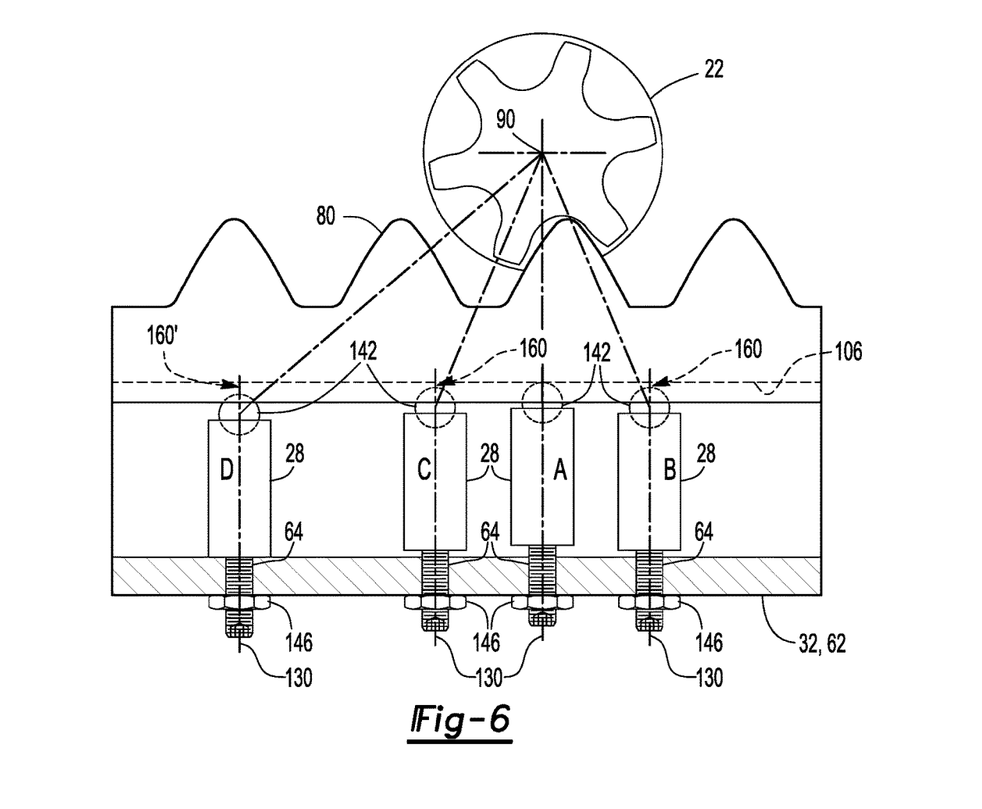
FIG. 6 is a fragmentary view of a portion of the differential carrier and a set of support bearing assemblies.

The support bearing mounting surface 62 may facilitate mounting of one or more support bearing assemblies 28. The support bearing mounting surface 62 may extend away from the axle housing 30. In addition, the support bearing mounting surface 62 may extend from the flange portion 50 and may be disposed substantially perpendicular to the flange portion 50 in one or more embodiments. As is best shown in FIG. 6, the support bearing mounting surface 62 may include one or more holes 64 that may extend through the support bearing mounting surface 62. A hole 64 may receive a support bearing assembly 28 as will be discussed in more detail below.

Referring to FIGS. 2 and 3, the bearing support 54 may receive a roller bearing assembly 70 that may rotatably support the differential 24. In FIG. 2, two bearing supports 54 are shown that are located inside the center portion 40 on opposite sides of the differential 24. A bearing support 54 may include a pair of legs that extend from flange portion 50 of the differential carrier 32 in a direction that extends away from the cover portion 52. As is best shown in FIG. 3, a bearing cap 72 may be mounted to the legs of the bearing support 54. The bearing cap 72 may arch over a corresponding roller bearing assembly 70 and may be mounted to the legs with fasteners like bolts. The legs and bearing cap 72 may extend around the roller bearing assembly 70 and may cooperate to receive and secure the roller bearing assembly 70.

Referring to FIGS. 2 and 3, the differential 24 may be disposed in the housing assembly 20. The differential 24 may transmit torque to the vehicle traction wheel assemblies and permit the traction wheel assemblies to rotate at different velocities. The differential 24 may include a ring gear 80 that may be disposed on a differential unit 82. These components are shown to facilitate an abbreviated discussion of the operation of the axle assembly 10 and differential 24.

Figure 4:
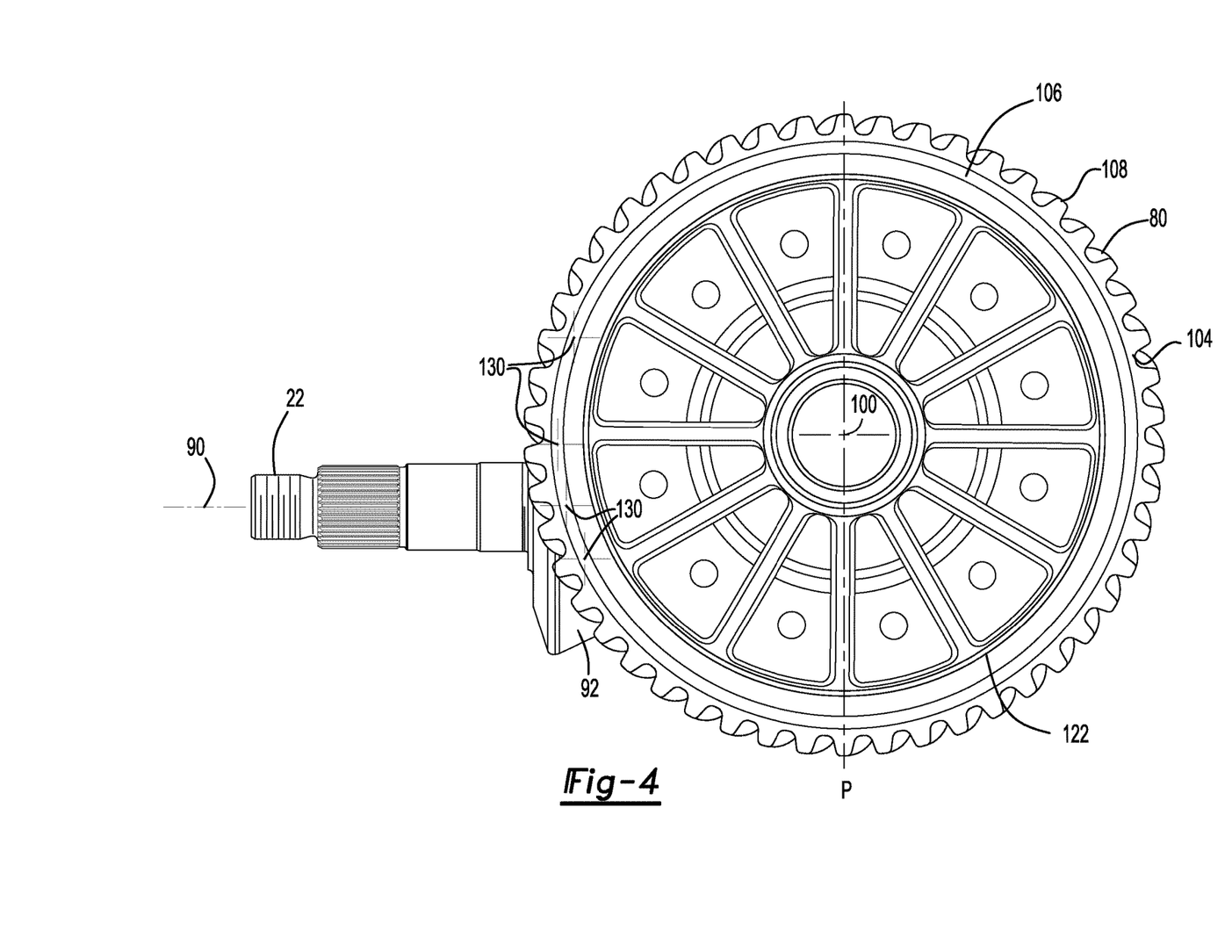
FIG. 4 is a side view of the drive pinion and ring gear of FIG. 3.

The drive pinion 22 may be operatively connected to a vehicle drivetrain component, such as a drive shaft, that may be coupled to an output of a vehicle transmission or transfer case. The vehicle transmission or transfer case may receive torque from a vehicle power source, such as an engine or motor. Alternatively, the drive pinion 22 may be operatively connected to an output of another axle assembly. The drive pinion 22 may be rotatably supported by one or more roller bearing assemblies that may be disposed in the differential carrier 32. As is best shown in FIG. 3, the drive pinion 22 may extend along and may rotate about a drive pinion axis 90. The drive pinion 22 may provide torque to the ring gear 80. More specifically, the drive pinion 22 may have a set of pinion teeth 92, which are best shown in FIGS. 2 and 4, that may mesh with corresponding teeth on the ring gear 80.

The ring gear 80 may transmit torque the differential unit 82. For instance, the ring gear 80 may be mounted to or may be operatively connected to the differential unit 82. The ring gear 80 may rotate about a ring gear axis 100 and may have a set of teeth 102 that may arranged around the ring gear axis 100.

The ring gear 80 may also have a back side 104 that may be disposed opposite the set of teeth 102. As is best shown in FIGS. 3 and 4, the back side 104 may optionally include a groove 106. The groove 106 may be disposed between and outside circumference 108 of the ring gear 80 and a ring gear mounting flange 122 upon which the ring gear 80 may be disposed. The groove 106 may extend continuously around the ring gear axis 100. In addition, the groove 106 may be radially disposed or disposed at a constant radial distance with respect to the ring gear axis 100. The groove 106 may have an arcuate or curved cross section that may receive a rolling element of the support bearing assembly 28 as will be discussed in more detail below. For instance, the groove 106 may have a generally semi-circular cross section in one or more embodiments.

Referring to FIGS. 2 and 3, the differential unit 82 may be mounted on the differential carrier 32 and may be rotatably supported by the roller bearing assemblies 70. The differential unit 82 may be disposed in the center portion 40 of the axle housing 30 when the differential carrier 32 is mounted on the axle housing 30. The differential unit 82 may be coupled to the axles 26 and may be configured to control rotation of the axles 26. For example, the differential unit 82 may permit the axles 26 to rotate at different speeds a may inhibit the axles 26 from rotating at different speeds depending on the position of a clutch collar. In at least one embodiment, the differential unit 82 may include a pair of output gears 110, a differential case 112, a spider 114, and one or more pinion gears 116.

An output gear 110 may be disposed on each axle 26. Each output gear 110 may rotate with a corresponding axle 26.

The differential case 112 may receive various components of the differential unit 82. The differential case 112 may be rotatably supported by the roller bearing assemblies 70 such that the differential case 112 may rotate about the ring gear axis 100. The differential case 112 may include a ring gear mounting flange 122. The ring gear mounting flange 122 may extend away from the axles 26 and may extend along and may engage the back side 104 of the ring gear 80. The ring gear 80 may be fixedly mounted to the ring gear mounting flange 122 with a plurality of fasteners, such as bolts. As such, the differential unit 82 may receive torque via the ring gear 80 and provide torque to the axles 26.

The spider 114 may be disposed in the differential case 112 and may be configured to rotate about the ring gear axis 100 with the differential case 112. The spider 114 may include one or more pins that may be received in the differential case 112. Each pin may support a pinion gear 116.

A pinion gear 116 may be rotatably disposed on each pin of the spider 114. The pinion gear 116 may include a set of teeth that mate with the output gears 110.

The axles 26 may transmit torque from the differential 24 to corresponding traction wheel assemblies. In FIG. 2, two axles 26 are provided such that each axle 26 extends through a different arm portion 42 of the axle housing 30. The axles 26 may extend along and may be rotated about the ring gear axis 100 by the differential 24. Each axle 26 may have a first end and a second end. The first end may be operatively connected to the differential 24. The second end may be disposed opposite the first end and may be located outside of the arm portion 42 of the axle housing 30. As shown in FIG. 1, an axle flange 118 may be disposed proximate the second end of the axle 26 and may facilitate mounting of a traction wheel assembly.

Referring to FIGS. 1 and 3, one or more support bearing assemblies 28 may be provided with the differential carrier 32. The support bearing assemblies 28 may extend from the support bearing mounting surface 62 toward the ring gear 80. Moreover, at least a portion of the support bearing assemblies 28 may extend along a support bearing assembly axis 130. The support bearing assembly axis 130 may be disposed substantially parallel to the ring gear axis 100 in one or more embodiments. Multiple support bearing assemblies 28 may be arranged such that the support bearing assemblies 28 may be disposed substantially parallel to each other.

The support bearing assemblies 28 may engage the back side 104 of the ring gear 80 to limit or inhibit deflection of the ring gear 80 away from the drive pinion 22. More specifically, the ring gear 80 may deflect away from the drive pinion 22 or drive pinion axis 90 in response to sufficiently high load forces exerted by the drive pinion 22. Such deflection may negatively impact the alignment and meshing of the pinion teeth 92 of the drive pinion 22 and the gear teeth 102 of the ring gear 80, which in turn may increase gear tooth wear. Limiting or inhibiting deflection of the ring gear 80 may help reduce wear and improve durability and life of the axle assembly 10.

Referring to FIGS. 3 and 4, the support bearing assemblies 28 may be disposed on the differential carrier 32 at a common radial distance from the ring gear axis 100. In addition, the support bearing assemblies 28 may be arranged around the ring gear axis 100 such that the support bearing assemblies 28 may be disposed near the drive pinion 22. As is best shown in FIG. 3, the support bearing assemblies 28 may be disposed between the outside circumference 108 of the ring gear 80 and plane P. Plane P may extend in a substantially perpendicular to the drive pinion axis 90 and may intersect the ring gear axis 100 such that the ring gear axis 100 is completely disposed in plane P. As such, the support bearing assemblies 28 may be disposed to the left of plane P from the perspective shown in FIG. 3. The support bearing assemblies 28 may also be clustered near the drive pinion 22. For example, the support bearing assemblies 28 may be disposed on the differential carrier 32 between the outside circumference 108 of the ring gear 80 and the flange portion 50 of the differential carrier 32 or to the left of the flange portion 50 from the perspective shown in FIG. 3.

Figure 5:
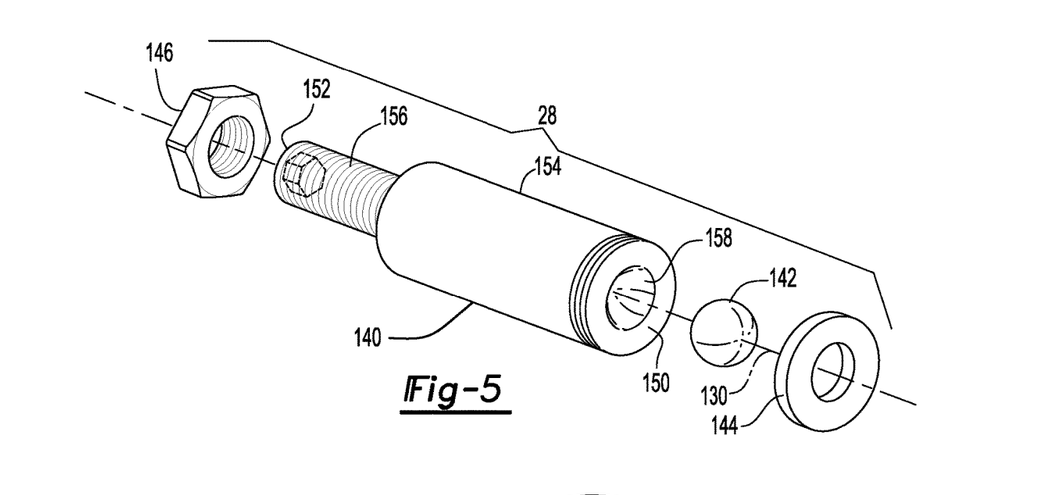
FIG. 5 is an exploded view of a support bearing assembly.

Referring to FIG. 5, an example of a support bearing assembly 28 is shown. The support bearing assembly 28 may include a thrust screw 140, a rolling element 142, a rolling element retainer 144, and a jam nut 146.

The thrust screw 140 may be fixedly disposed on the differential carrier 32. The thrust screw 140 may extend from the differential carrier 32 toward the back side 104 of the ring gear 80. In the configuration shown, the thrust screw 140 extends along the support bearing assembly axis 130. The thrust screw 140 may have a first end 150, a second end 152, a body portion 154, a threaded portion 156, and a rolling element socket 158.

The first end 150 or first end surface may face toward the back side 104 of the ring gear 80. The first end 150 may be spaced apart from and may not engage the ring gear 80.

The second end 152 or second end surface may be disposed opposite the first end 150. The second end 152 may be disposed outside the differential carrier 32 when the support bearing assembly 28 is fastened to the differential carrier 32.

The body portion 154 may extend from the first end 150 toward the second end 152. More specifically, the body portion 154 may extend from the first end 150 to the threaded portion 156. The body portion 154 may have any suitable configuration. In FIG. 5, the body portion 154 extends along the support bearing assembly axis 130 and is substantially cylindrical. The body portion 154 may be larger than the hole 64 in the support bearing mounting surface 62 of the differential carrier 32 and may act as a stop that may limit axial movement of the thrust screw 140 away from the ring gear 80.

The threaded portion 156 may extend from the second end 152 to the body portion 154. The threaded portion 156 may extend through the hole 64 in the support bearing mounting surface 62 and include one or more threads that may mate with one or more corresponding threads on the jam nut 146.

The rolling element socket 158 may receive and support the rolling element 142 in a manner that permits the rolling element 142 to roll or rotate within the rolling element socket 158. The rolling element socket 158 may be provided with the first end 150. For example, the rolling element socket 158 may be a recess or indentation that may extend from the first end 150 toward the second end 152. The rolling element socket 158 may have any suitable configuration that is compatible with the rolling element 142. In FIG. 5, the rolling element socket 158 has a generally semi spherical configuration and is centered along the support bearing assembly axis 130.

The rolling element 142 may rotatably support or rotatably engage the ring gear 80. For example, the rolling element 142 may rotate or roll with respect to the ring gear 80 and the thrust screw 140. The rolling element 142 may have any suitable configuration. In FIG. 5, the rolling element 142 is configured as a substantially spherical ball bearing; however, it is contemplated that the rolling element 142 may be provided in various other configurations, such as a cylindrical roller bearing or the like. The rolling element socket 158 may have a semi-cylindrical configuration to accommodate a cylindrical roller bearing. Regardless of the shape of the rolling element 142, the rolling element 142 may roll or rotate within the rolling element socket 158 and may roll or rotate along the back side 104 of the ring gear 80. If the ring gear 80 is provided with a groove 106, then the rolling element 142 may be received in the groove 106 and the groove 106 may help guide, align and retain the rolling element 142.

A rolling element retainer 144 may be provided to help retain the rolling element 142 to the thrust screw 140. The rolling element retainer 144 may be disposed on the body portion 154 of the thrust screw 140 and may help hold the rolling element 142 in the rolling element socket 158 such that the rolling element 142 may be captured between the rolling element socket 158 and the rolling element retainer 144 but may be free to roll or rotate. The rolling element retainer 144 may have an opening through which a portion of the rolling element 142 may extend. The opening may be sized such that the rolling element 142 cannot pass through the opening. For instance, the opening may have a diameter that is smaller than the diameter of the rolling element 142 when the rolling element is configured as a ball bearing. The rolling element retainer 144 may have any suitable configuration. For instance, the rolling element retainer 144 may be configured as a bracket, cap or clip that may capture the rolling element 142. In FIG. 5, the rolling element retainer 144 is generally configured as a ring that is disposed proximate or disposed on the first end 150. The rolling element retainer 144 may be coupled to the thrust screw 140 in any suitable manner, such as with mating threads, an interference fit, interlocking mating features, adhesive, welding or the like.

The jam nut 146 may secure the thrust screw 140 to the differential carrier 32. The jam nut 146 may have a threaded hole that may receive the threaded portion of the thrust screw 140. The jam nut 146 may be disposed outside the differential carrier 32. As such, the jam nut 146 may be disposed on and may engage the support bearing mounting surface 62 when the jam nut 146 is tightened with respect to the differential carrier 32 or against the differential carrier 32.

A seal may be provided between the thrust screw 140 and the hole in the differential carrier 32 to inhibit leakage of lubricant from the axle assembly 10 and to inhibit contaminants from entering the axle assembly 10. The seal may be of any suitable type and may be made of any suitable material. The seal may be provided inside the differential carrier 32 proximate a hole that receives the thrust screw 140, in the hole, outside the hole proximate the support bearing mounting surface 62 and the jam nut 146, or combinations thereof.

Referring to FIG. 6, a set of support bearing assemblies 28 is shown. For illustration purposes, four support bearing assemblies 28 are depicted; however, it is contemplated that a greater or lesser number of support bearing assemblies 28 may be provided. For convenience in reference, the support bearing assemblies 28 are labeled A, B, C, and D. The support bearing assemblies 28 are all disposed near the outside circumference 108 of the ring gear 80 and may be disposed directly opposite the set of teeth 102 of the ring gear 80. The support bearing assemblies 28 may be arranged around the ring gear axis 100 and may be aligned with the groove 106 on the ring gear 80.

Support bearing assembly A may be disposed closer to the drive pinion 22 than support bearing assemblies B, C, and D. In FIG. 6, support bearing assembly A is disposed directly opposite the drive pinion 22. As such, the support bearing assembly axis 130 for support bearing assembly A may intersect the drive pinion axis 90. The rolling element 142 for support bearing assembly A may be disposed in the groove 106 of the ring gear 80 and may engage the bottom of the groove 106. The bottom of the groove 106 is represented by the dashed line extending through the ring gear 80 in FIG. 6.

Support bearing assemblies B and C may be disposed adjacent to support bearing assembly A. Support bearing assemblies B and C may be disposed further from the drive pinion 22 or at a greater distance from the drive pinion 22 than support bearing assembly A as represented by the lines extending from the drive pinion axis 90 to each support bearing assembly. In FIG. 6, support bearing assemblies B and C are disposed on opposite sides of support bearing assembly A and may be disposed the same distance from support bearing assembly A.

Support bearing assembly D may be disposed at a greater distance from the drive pinion 22 and the drive pinion axis 90 than support bearing assemblies A, B, and C.

The support bearing assemblies A, B, C and D may be disposed at varying axial distances from the ring gear 80. For example the support bearing assemblies 28 may be offset from the ring gear such that the support bearing assemblies 28 are disposed further from the ring gear 80 in an axial direction (i.e., in a direction that may extend along the support bearing assembly axis 130) as a distance from the drive pinion 22 or drive pinion axis 90 increases.

For example, support bearing assemblies B and C may be disposed further from the ring gear 80 than support bearing assembly A. As such, the thrust screws 140 for support bearing assemblies B and C may be disposed further away from the back side 104 of the ring gear 80 than support bearing assembly A. As such, a gap 160 may be provided between the bottom of the groove 106 and the rolling elements 142 for support bearing assemblies B and C when the ring gear 80 is in a nominal or un-deflected condition. As such, the rolling elements 142 for support bearing assemblies B and C may encounter lower load forces than the rolling element for support bearing assembly A when the ring gear 80 is in the nominal condition, thereby reducing rolling resistance and wear on their rolling elements 142. The rolling elements 142 for support bearing assemblies B and C may engage the bottom of the groove 106 when the ring gear 80 is deflected.

Support bearing assembly D may be disposed further from the ring gear 80 than support bearing assemblies A, B and C. As such, a gap 160' may be provided between the bottom of the groove 106 and the rolling element 142 for support bearing assembly D when the ring gear 80 is in a nominal or un-deflected condition may be greater than the gap 160 that is associated with support bearing assemblies B and C. The rolling element 142 for support bearing assembly D may engage the bottom of the groove 106 when the ring gear 80 is deflected.

Figures 7, 8, 9:
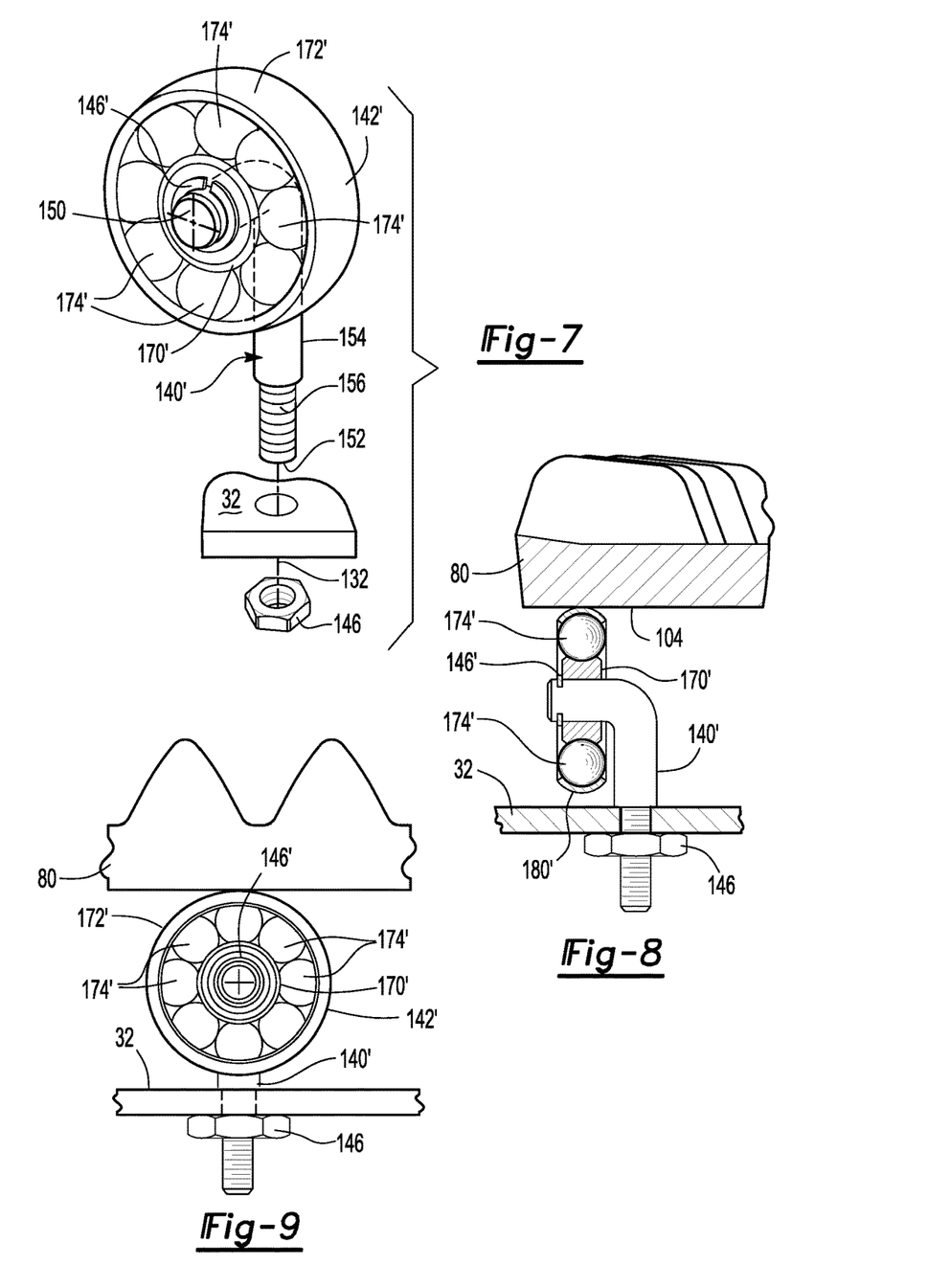
FIG. 7 is a partially exploded view of another support bearing assembly.
FIGS. 8 and 9 are fragmentary views of a portion of a differential carrier and the support bearing assembly of FIG. 7.

Referring to FIGS. 7-9, another configuration of a support bearing assembly 28' is shown. The support bearing assembly 28' may include a thrust screw 140', a roller bearing assembly 142', a jam nut 146, and optionally a retainer 146'.

The thrust screw 140' may have a substantially L-shaped configuration and may be fixedly disposed on the differential carrier 32. More specifically, the thrust screw 140' may extend from the differential carrier 32 toward the back side 104 of the ring gear 80 and may then bend and extend in a direction that may be substantially parallel to the back side 104 of the ring gear 80. The thrust screw 140' may have a first end 150, a second end 152, a body portion 154, and a threaded portion 156 similar to those previously described. The thrust screw 140' may support the roller bearing assembly 142'.

The roller bearing assembly 142' may be disposed on the thrust screw 140'. More specifically, the roller bearing assembly 142' may be configured to rotate about the bent portion of the thrust screw 140'. In at least one embodiment, the roller bearing assembly 142' may have an inner race 170', an outer race 172', and a plurality of rolling elements 174'.

The inner race 170' may be disposed on and may engage the thrust screw 140'. For example, the inner race 170' may be configured as a ring that may extend around the bend portion of the thrust screw 140'. As such, the inner race 170' may be disposed on the bent portion of the thrust screw 140' and may not engage the ring gear 80.

The outer race 172' may be configured as a ring that may extend around and may be spaced apart from the inner race 170'. The outer race 172' may engage and roll along the back side 104 of the ring gear 80.

Referring to FIG. 8, the outer race 172' may have a curved outer surface 180' that may engage the back side 104 of the ring gear 80. The curved outer surface 180' may extend along an arc in a direction that extends away from the ring gear 80. As such, the curved outer surface 180' may be convex with respect to the back side 104 of the ring gear 80. The curved outer surface 180' may help direct load forces toward the center of the rolling elements 174' and may help reduce the amount of surface area that may contact the ring gear 80, which in turn may help reduce friction or frictional drag forces. Moreover, the groove 106 on the ring gear 80 may be omitted in such a configuration that employs a roller bearing assembly.

The rolling elements 174' may be disposed between the inner race 170' and the outer race 172'. The rolling elements 174' may facilitate rotation of the outer race 172' with respect to the inner race 170'. The rolling elements 174' may have any suitable configuration that may be compatible with the inner race 170' and the outer race 172'.

Figure 10:
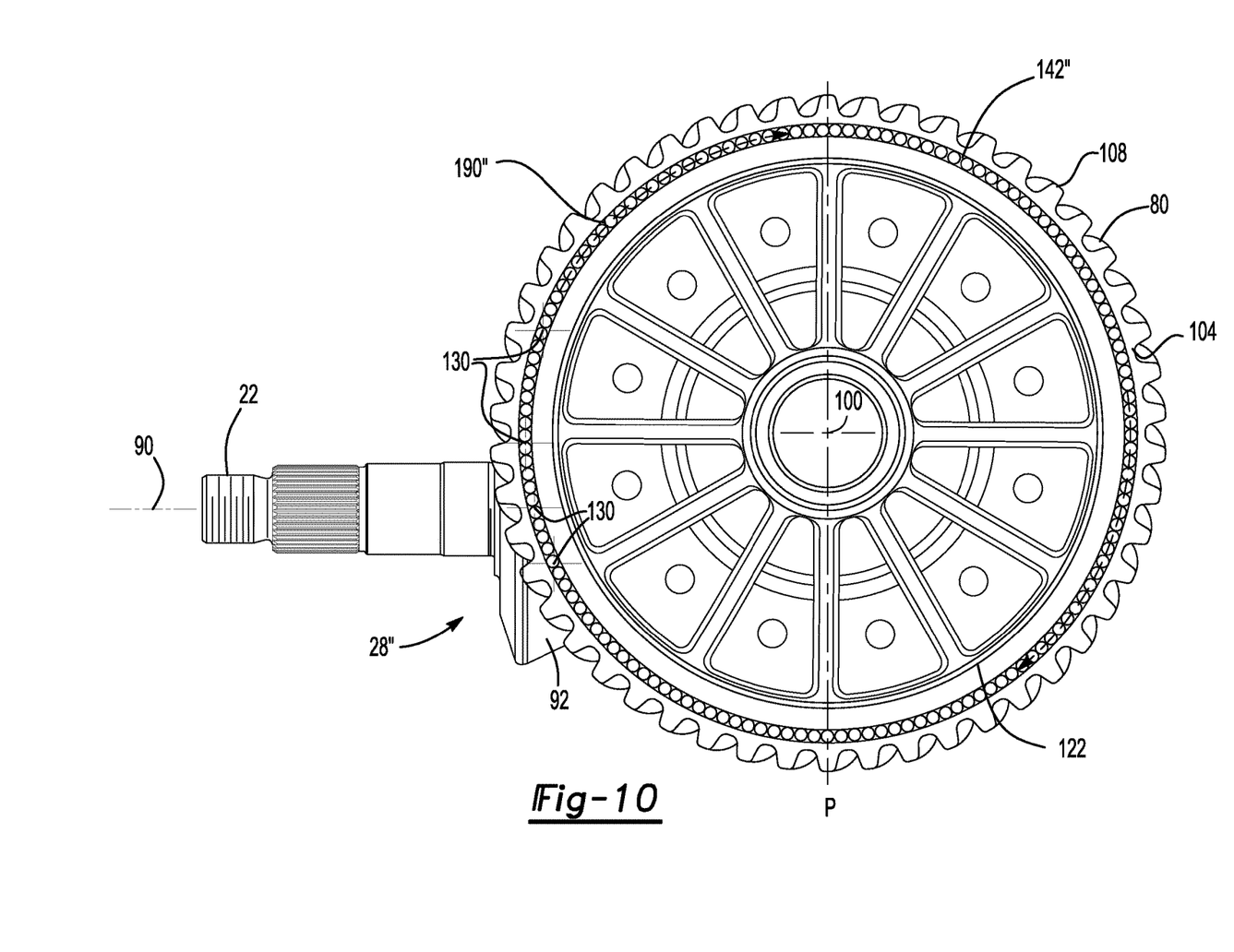
FIG. 10 is a side view of a drive pinion and a ring gear with another version of a support bearing assembly.

Referring to FIG. 10, another version of a support bearing assembly 28" is shown. In this version, a roller bearing assembly 142" may be disposed on the back side 104 of the ring gear 80 and the thrust screw 140 may extend to engage the roller bearing assembly 142". The roller bearing assembly 142" may be configured as a ring that may extend continuously around the ring gear axis 100. The roller bearing assembly 142" may be of any suitable type, such as a thrust roller bearing. For example, the roller bearing assembly 142" may have a first race that may be fixedly mounted on the back side 104 of the ring gear 80, a second race that may face toward the thrust screw 140, and a plurality of rolling elements 190" that may be rotatably disposed between the first race and the second race and that may protrude through openings in the second race. The rolling elements 190" may have any suitable configuration. In FIG. 10, the rolling elements 190" are depicted as ball bearings, but could be needle bearings, tapered needle bearings, or the like. The thrust screw 140 may engage at least one rolling element 190" that protrudes through the second race. As such, the rolling elements 190" may roll onto the end of the thrust screw 140 and roll off of the end of at least one thrust screw 140 as the ring gear 80 rotates. It is noted that in such a configuration the roller bearing socket may be omitted from the thrust screw 140 as well as the groove 106 on the ring gear 80.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a differential carrier;
   a ring gear that is rotatable about a ring gear axis and is rotatably supported on the differential carrier, wherein the ring gear has a set of teeth and a back side disposed opposite the set of teeth, the back side having a groove that extends around the ring gear axis;
   a drive pinion that is in meshing engagement with the set of teeth of the ring gear; and
   a support bearing assembly that is mounted to the differential carrier and that engages the back side of the ring gear, wherein the support bearing assembly rotatably engages the ring gear and inhibits deflection of the ring gear away from the drive pinion, the support bearing assembly having a rolling element that is received in the groove and a thrust screw that extends from the differential carrier toward the back side of the ring gear, wherein the thrust screw supports the rolling element.

2. The axle assembly of claim 1 wherein the support bearing assembly is disposed directly opposite the set of teeth.

3. The axle assembly of claim 2 wherein the support bearing assembly is disposed opposite the drive pinion.

4. The axle assembly of claim 1 wherein the rolling element rotates on the back side of the ring gear.

5. The axle assembly of claim 1 wherein the thrust screw extends through a hole in the differential carrier.

6. The axle assembly of claim 5 wherein the thrust screw is secured to the differential carrier with a jam nut.

7. The axle assembly of claim 6 wherein the jam nut is disposed outside the differential carrier.

8. The axle assembly of claim 1 wherein the thrust screw has a first end that faces toward the ring gear and a rolling element socket that is disposed in the first end, wherein the rolling element is received in the rolling element socket.

9. An axle assembly comprising:
   a differential carrier;
   a ring gear that is rotatably supported on the differential carrier, wherein the ring gear has a set of teeth and a back side disposed opposite the set of teeth;
   a drive pinion that is in meshing engagement with the set of teeth of the ring gear; and
   a support bearing assembly that is mounted to the differential carrier and that engages the back side of the ring gear, wherein the support bearing assembly rotatably engages the ring gear and inhibits deflection of the ring gear away from the drive pinion, the support bearing assembly having a thrust screw that extends from the differential carrier toward the back side of the ring gear and supports a roller bearing assembly that engages the back side of the ring gear, wherein the roller bearing assembly rotates about the thrust screw.

10. The axle assembly of claim 9 wherein the ring gear is rotatable about a ring gear axis and the roller bearing assembly is a ring that extends continuously around the ring gear axis.

11. The axle assembly of claim 10 wherein the roller bearing assembly has an inner race that is disposed on the thrust screw, an outer race that is disposed on the back side of the ring gear, and a plurality of rolling elements disposed between the inner race and the outer race.

12. The axle assembly of claim 11 wherein the outer race has a curved outer surface that engages the back side of the ring gear, wherein the curved outer surface is convex with respect to the back side.

13. The axle assembly of claim 10 wherein the thrust screw has an L-shaped configuration.

14. An axle assembly comprising:
   a differential carrier;
   a ring gear that is rotatably supported on the differential carrier, wherein the ring gear has a set of teeth and a back side disposed opposite the set of teeth;
   a drive pinion that is in meshing engagement with the set of teeth of the ring gear; and
   a support bearing assembly that is mounted to the differential carrier and that engages the back side of the ring gear, wherein the support bearing assembly rotatably engages the ring gear and inhibits deflection of the ring gear away from the drive pinion, the support bearing assembly having a thrust screw that has an L-shaped configuration and that extends from the differential carrier toward the back side of the ring gear and supports a roller bearing assembly that engages the back side of the ring gear.

15. The axle assembly of claim 14 wherein the thrust screw extends from the differential carrier to the roller bearing assembly and the roller bearing assembly rotates with respect to the thrust screw.

16. An axle assembly comprising:
a differential carrier;
a ring gear that is rotatably supported by the differential carrier, wherein the ring gear has a set of teeth and a back side disposed opposite the set of teeth;
a drive pinion that is in meshing engagement with the set of teeth; and
a set of support bearing assemblies that extends from the differential carrier toward the back side of the ring gear, wherein at least one member of the set of support bearing assemblies is disposed closer to the back side than another member of the set of support bearing assemblies.

17. The axle assembly of claim 16 wherein the set of support bearing assemblies are offset from the ring gear such that members of the set of support bearing assemblies are disposed further from the ring gear as a distance from the drive pinion increases.

18. The axle assembly of claim 16 wherein the back side has a groove that extends around a ring gear axis and the set of support bearing assemblies includes a first member that has a first rolling element that engages a bottom of the groove and a second member that has a second rolling element that is disposed in the groove such that a gap is provided between the second rolling element and the bottom of the groove before the ring gear is deflected.

19. The axle assembly of claim 16 wherein the set of support bearing assemblies is disposed between an outside circumference of the ring gear and a ring gear mounting flange upon which the ring gear is disposed.

20. The axle assembly of claim 16 wherein the ring gear rotates about a ring gear axis, the drive pinion rotates about a drive pinion axis, and the set of support bearing assemblies is disposed on the differential carrier between an outside circumference of the ring gear and a plane that is disposed perpendicular to the drive pinion axis, wherein the ring gear axis is completely disposed in the plane.

* * * * *

UNITED STATES PATENT AND TRADEMARK OFFICE
CERTIFICATE OF CORRECTION

Page 1 of 1

PATENT NO. : 10,179,477 B2
APPLICATION NO. : 15/205255
DATED : January 15, 2019
INVENTOR(S) : Dale Eschenburg et al.

It is certified that error appears in the above-identified patent and that said Letters Patent is hereby corrected as shown below:

In the Claims

Column 10, Line 43, Claim 11:
After "The axle assembly of claim"
Delete "10" and
Insert -- 9 --.

Column 10, Line 52, Claim 13:
After "The axle assembly of claim"
Delete "10" and
Insert -- 9 --.

Signed and Sealed this
Thirtieth Day of April, 2019

Andrei Iancu
*Director of the United States Patent and Trademark Office*